Dec. 29, 1936.    G. D. KELLOGG    2,066,006
BUILDING ASSEMBLY AND FASTENING MEANS
Filed Sept. 10, 1935
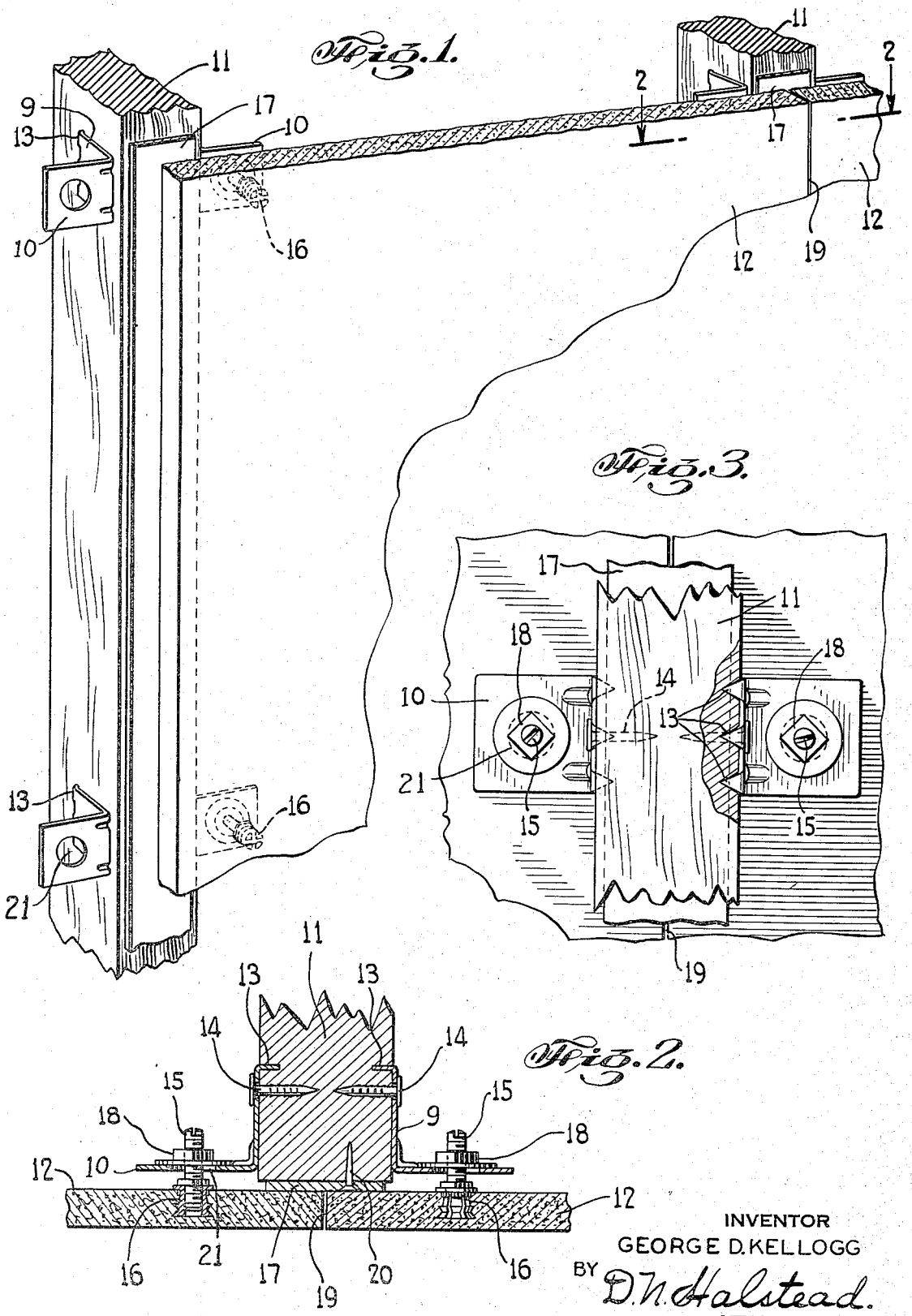
INVENTOR
GEORGE D. KELLOGG
BY D. N. Halstead.
ATTORNEY

UNITED STATES PATENT OFFICE 2,066,006

BUILDING ASSEMBLY AND FASTENING MEANS

George D. Kellogg, Pelham, N. Y., assignor to Johns-Manville Corporation, New York, N. Y., a corporation of New York Application September 10, 1935, Serial No. 39,890

8 Claims. (Cl. 72—16)

This invention relates to a building assembly and to fastening means for use therein.

In making partitions, exterior walls, or other building assemblies from prefabricated units of facing material, there are required means for providing a tightly closed joint between the adjacent units while permitting appreciable lateral movement of the units, as on expansion or contraction with varying atmospheric conditions, and, at the same time, preventing rattling or the emission of a drumming sound when a unit in the assembly is struck.

It is an object of the invention to provide a wall assembly meeting one or more of these requirements. Other objects and advantages will appear from the detailed description that follows.

The invention will be described in connection with the embodiment thereof that is illustrated in the attached drawing.

Fig. 1 shows a perspective view of a wall assembly constructed in accordance with my invention.

Fig. 2 shows a sectional view on line 2—2 of Fig. 1.

Fig. 3 shows a rear elevation of the assembly of Fig. 1.

The assembly includes frame members 11 of the type of studs, say; wooden studs or beams, units 12 of facing material, as, for example, compressed and hardened panels of asbestos and Portland cement, and means securing the facing units to the frame members or supporting substructure.

The said means include a bracket clip having one leg 9 secured to a side of one of the frame members and suitably extending approximately parallel thereto and another leg 10 secured to the back surface of one of the facing units and preferably extending approximately parallel and in spaced relationship thereto. The leg 9 of the bracket clip, at the end portion thereof, may have a driving point or points 13 integral with the leg, as, for example, struck out therefrom and extending into the frame member and/or other fastening means, such as the barbed nail 14, passing through a preformed hole, at a short distance from the said end portion and into the frame member. Advantageously, the leg is secured at a plurality of spaced positions firmly to the substructure.

For best results, the leg 10 of the clip that is secured to the facing unit is preferably springy. Thus, the leg may consist of steel sheeting of such thickness as to be difficultly sprung or bent, say of 14 gauge. This leg is provided with a hole 21 through which passes a fastening element 15 that is undersized (with respect to the hole) and is engaged at one end behind the material forming the edge of the hole, and, at the other end, in a facing unit. Suitably, the fastening element is a threaded bolt engaged in the facing material by means of an expansion nut 16 and engaged behind the hole in the leg of the clip by a conventional nut 18.

The fastening means or bracket clip is suitably so positioned on the frame member that the leg 10 of the clip secured to the facing unit is spaced therefrom. With such spacing and with the springiness of this leg of the clip, the nut 18 may be turned down on the bolt 15 to flex slightly the leg 10 and thus secure the facing unit resiliently to the substructure or frame member.

To promote further the resilience of the whole assembly, sealing of the joint 19 between adjacent units meeting at their edges in flush relationship in front of one of the frame members, and/or minimizing rattling, there is used, in the preferred embodiment of the invention, a resiliently yieldable gasket 17 disposed between the said joint or facing unit and the face of the frame member 11. This gasket may be a relatively thick strip of felt, or cloth but is preferably constituted of cork, rubber or other composition that may be maintained under compression with preservation of the tendency to spring back and, within limits, close the space presented to it. The strip may be secured to the face of the frame member 11 by any convenient means, as, for example, by a tack 20.

When the nuts 18 are tightened on the bolts 15, to flex the legs 10 of the bracket clips secured each to one of the adjacent facing units forming the joint 19 therebetween, the units are drawn under tension against the gasket, and the gasket is thereby compressed, with resultant tight closing of the said joint, at the rear portion thereof, and also sealing of the space between the edge portion of each of the units and the face of the frame member.

There is thus provided a simple and efficient assembly having the advantages indicated. Also, the means supporting the units in the finished assembly are completely concealed from view from a forward position. Also, the fact that the hole in the leg of the clip secured to a facing unit is oversize, with respect to the element 15 passing therethrough, makes possible lateral shifting of the facing units towards or away from the joint; at the same time, holding of the units by spring action against the substructure or gasket thereon prevents the development of an open space between the units and the substructure.

It will be understood that the details given are for the purpose of illustration, not restriction, and particularly that certain of the elements or features described may be omitted from the assembly if their function is not desired. It is intended, therefore, that variations within the spirit of the invention are to be included within the scope of the appended claims.

What I claim is:

1. A building assembly comprising a frame member of the type of a stud, units of facing material meeting to form a joint in front of the said member, a resiliently yieldable gasket disposed between the said joint and member, and means including each an element secured to the said member and a springy element secured to one of the said units supporting the said units upon the frame member and drawing them under tension against the said gasket.

2. A building assembly comprising a frame member of the type of a stud, units of facing material meeting in flush relationship to form a joint in front of the said member, and springy means supporting the said units upon the said member and minimizing rattling of the assembly, the said means including a bracket clip, means securing a leg thereof to the said member, and means securing the other leg of the bracket to one of the facing units, the said other leg being springy.

3. A building assembly comprising a frame member of the type of a stud, a unit of facing material disposed in front of the said member, a bracket clip, a driving point integral with one leg of the bracket and extending therefrom into the frame member, and means securing the other leg of the bracket to the said unit.

4. A building assembly comprising a frame member of the type of a stud, a unit of facing material disposed in front of the said member, a bracket clip, a driving point integral with one leg of the bracket and extending therefrom into the frame member, and means securing the other leg of the bracket to the said unit in spaced relationship thereto, the said other leg being springy.

5. A building assembly comprising a frame member of the type of a stud, a unit of facing material disposed in front of the said member, a bracket clip, a driving point integral with one leg of the bracket and extending therefrom into the frame member, and means securing the other leg of the bracket to the said unit in spaced relationship thereto, the said other leg being provided with a hole and the said means securing it to the unit including an undersized fastening element extending through the said hole, engaged at one end therebehind, and at the other end engaging the said unit, whereby limited lateral movement of the unit with respect to the clip is permitted.

6. A bracket clip adapted for use in supporting a unit of facing material upon a frame member of the type of a stud, comprising one leg portion provided with a driving point adapted to be engaged in the frame member and another springy leg adapted to be secured to the said unit.

7. A building assembly comprising a frame member of the type of a stud, units of facing material meeting to form a joint in front of the said member, a resiliently yieldable gasket disposed between the said joint and member and springy means supporting the said units upon the frame member and drawing them by spring action against the said gasket.

8. A building assembly comprising a frame member of the type of a stud, a facing member adjacent said frame member, a resiliently compressible gasket positioned between the frame member and facing member, and angular spring clip means firmly connected at spaced points to the frame member and facing member, respectively, to join said members.

GEORGE D. KELLOGG.